United States Patent
Long et al.

(10) Patent No.: US 7,065,672 B2
(45) Date of Patent: Jun. 20, 2006

(54) APPARATUS AND METHODS FOR FAULT-TOLERANT COMPUTING USING A SWITCHING FABRIC

(75) Inventors: Finbarr Denis Long, Blackrock (IE); Joseph Ardini, Needham, MA (US); Dana A. Kirkpatrick, Northborough, MA (US); Michael James O'Keeffe, Malahide (IE)

(73) Assignee: Stratus Technologies Bermuda Ltd., Hamilton (BM)

( * ) Notice: Subject to any disclaimer, the term of this patent is extended or adjusted under 35 U.S.C. 154(b) by 743 days.

(21) Appl. No.: 09/819,883

(22) Filed: Mar. 28, 2001

(65) Prior Publication Data

US 2002/0144175 A1    Oct. 3, 2002

(51) Int. Cl.
*G06F 11/16* (2006.01)
*G06F 11/00* (2006.01)

(52) U.S. Cl. .............................. 714/11; 714/4; 714/10; 714/12; 714/797; 712/11

(58) Field of Classification Search .................. 714/4, 714/10, 11, 12, 797; 712/11
See application file for complete search history.

(56) References Cited

U.S. PATENT DOCUMENTS

| | | | |
|---|---|---|---|
| 3,192,362 A | 6/1965 | Cheney | |
| 3,533,065 A | 10/1970 | McGilvray et al. | |
| 3,533,082 A | 10/1970 | Schnabel et al. | |
| 3,544,973 A | 12/1970 | Borck, Jr. et al. | ....... 340/172.5 |
| 3,548,176 A | 12/1970 | Shutler | ........................ 235/153 |
| 3,593,307 A | 7/1971 | Gouge, Jr. et al. | |
| 3,641,505 A | 2/1972 | Artz et al. | ................ 340/172.5 |
| 3,665,173 A | 5/1972 | Bouricius et al | |
| 3,681,578 A | 8/1972 | Stevens | |
| 3,688,274 A | 8/1972 | Cormier et al. | |
| 3,710,324 A | 1/1973 | Cohen et al. | ............. 340/172.5 |
| 3,736,566 A | 5/1973 | Anderson et al. | ........ 340/172.5 |
| 3,783,250 A | 1/1974 | Fletcher et al. | |
| 3,795,901 A | 3/1974 | Boehm et al. | ............ 340/172.5 |
| 3,805,039 A | 4/1974 | Stiffler | .................. 235/153 AE |
| 3,820,079 A | 6/1974 | Bergh et al. | .............. 340/172.5 |
| 3,840,861 A | 10/1974 | Amdahl et al. | ........... 340/172.5 |
| 3,879,712 A | 4/1975 | Edge et al. | |

(Continued)

FOREIGN PATENT DOCUMENTS

EP    0 301 499 A2    2/1989

(Continued)

OTHER PUBLICATIONS

Dell Computer Corporation White Paper, "Infiniband Architecture: Next Generation Server I/O," XP002242048 (Oct. 2000), Retrieved from the internet: <URL http//www.ece.northwestern.edu/{schiu/sd/IBA.pdf> on May 21, 2003, pp. 1-10.

(Continued)

*Primary Examiner*—Robert Beausoliel
*Assistant Examiner*—Joseph D Manoskey
(74) *Attorney, Agent, or Firm*—Kirkpatrick & Lockhart Nicholson Graham LLP

(57) ABSTRACT

Apparatus and methods for fault-tolerant computing using an asynchronous switching fabric where at least one of a plurality of redundant data processing elements executing substantially identical instructions communicates transactions to at least one target device, such as input/output device, or another data processing element. The transactions are communicated through the asynchronous switching fabric wherein each of the data processing elements and the target device are connected to the asynchronous switching fabric through a respective channel adapter.

18 Claims, 8 Drawing Sheets

U.S. PATENT DOCUMENTS

| | | | |
|---|---|---|---|
| 3,991,407 A | 11/1976 | Jordan, Jr. et al. | |
| 3,997,896 A | 12/1976 | Cassarino, Jr. et al. | 340/172.5 |
| 4,015,246 A | 3/1977 | Hopkins, Jr. et al. | 340/172.5 |
| 4,030,074 A | 6/1977 | Giorcelli | |
| 4,032,893 A | 6/1977 | Moran | 340/166 R |
| 4,059,736 A | 11/1977 | Perucca et al. | 179/175.2 R |
| 4,099,234 A | 7/1978 | Woods et al. | |
| 4,176,258 A | 11/1979 | Jackson | |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. et al. | 364/200 |
| 4,323,966 A | 4/1982 | Whiteside et al. | |
| 4,356,550 A | 10/1982 | Katzman et al. | |
| 4,358,823 A | 11/1982 | McDonald et al. | |
| 4,366,535 A | 12/1982 | Cedolin et al. | 364/200 |
| 4,369,494 A | 1/1983 | Bienvenu et al. | |
| 4,375,683 A | 3/1983 | Wensley | |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |
| 4,486,826 A | 12/1984 | Wolff et al. | 364/200 |
| 4,503,496 A | 3/1985 | Holzner et al. | 364/200 |
| 4,503,535 A | 3/1985 | Budde et al. | |
| 4,507,784 A | 3/1985 | Procter | |
| 4,543,628 A | 9/1985 | Pomfret | 364/200 |
| 4,562,575 A | 12/1985 | Townsend | |
| 4,583,224 A | 4/1986 | Ishii et al. | |
| 4,589,066 A | 5/1986 | Lam et al. | |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,610,013 A | 9/1986 | Long et al. | |
| 4,622,667 A | 11/1986 | Yount | |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,633,467 A | 12/1986 | Abel et al. | |
| 4,644,498 A | 2/1987 | Bedard et al. | |
| 4,648,031 A | 3/1987 | Jenner | |
| 4,654,846 A | 3/1987 | Goodwin et al. | |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,686,677 A | 8/1987 | Flora | |
| 4,700,292 A | 10/1987 | Campanini | 364/200 |
| 4,703,420 A | 10/1987 | Irwin | 364/200 |
| 4,736,377 A | 4/1988 | Bradley et al. | |
| 4,739,498 A | 4/1988 | Eichhorn | |
| 4,750,177 A | 6/1988 | Hendrie et al. | 371/32 |
| 4,799,140 A | 1/1989 | Dietz et al. | |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,866,604 A | 9/1989 | Reid | 364/200 |
| 4,905,181 A | 2/1990 | Gregory | |
| 4,907,232 A | 3/1990 | Harper et al. | |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,005,174 A | 4/1991 | Bruckert et al. | |
| 5,020,024 A | 5/1991 | Williams | |
| 5,083,258 A | 1/1992 | Yamasaki | 395/725 |
| 5,089,958 A | 2/1992 | Horton et al. | |
| 5,099,485 A | 3/1992 | Bruckert et al. | |
| 5,117,486 A | 5/1992 | Clark et al. | 395/250 |
| 5,136,704 A | 8/1992 | Danielson et al. | |
| 5,138,257 A | 8/1992 | Katsura | 324/158 R |
| 5,155,809 A | 10/1992 | Baker et al. | |
| 5,157,663 A | 10/1992 | Major et al. | |
| 5,179,663 A | 1/1993 | Iimura | 395/250 |
| 5,193,162 A | 3/1993 | Bordsen et al. | |
| 5,193,180 A | 3/1993 | Hastings | |
| 5,226,152 A * | 7/1993 | Klug et al. | 714/12 |
| 5,231,640 A | 7/1993 | Hanson et al. | |
| 5,243,704 A | 9/1993 | Baty et al. | 395/325 |
| 5,247,522 A | 9/1993 | Reiff | 371/29.5 |
| 5,249,187 A | 9/1993 | Bruckner et al. | |
| 5,251,303 A | 10/1993 | Fogg, Jr. et al. | 395/275 |
| 5,263,034 A | 11/1993 | Guenthner et al. | |
| 5,270,699 A | 12/1993 | Signaigo et al. | 340/825.01 |
| 5,271,023 A | 12/1993 | Norman | |
| 5,283,870 A | 2/1994 | Joyce et al. | |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,321,706 A | 6/1994 | Holm et al. | |
| 5,333,265 A | 7/1994 | Orimo et al. | |
| 5,357,612 A | 10/1994 | Alaiwan | |
| 5,361,267 A | 11/1994 | Godiwala et al. | |
| 5,379,381 A | 1/1995 | Lamb | |
| 5,384,906 A | 1/1995 | Horst | |
| 5,388,242 A | 2/1995 | Jewett | |
| 5,392,302 A | 2/1995 | Kemp et al. | |
| 5,404,361 A | 4/1995 | Casorso et al. | |
| 5,423,024 A | 6/1995 | Cheung | |
| 5,428,766 A | 6/1995 | Seaman | 395/575 |
| 5,430,866 A | 7/1995 | Lawrence et al. | |
| 5,463,755 A | 10/1995 | Dumarot et al. | 395/475 |
| 5,465,328 A | 11/1995 | Dievendorff et al. | |
| 5,465,340 A | 11/1995 | Creedon et al. | 395/846 |
| 5,537,535 A | 7/1996 | Maruyama et al. | 395/183.01 |
| 5,550,986 A | 8/1996 | DuLac | 395/280 |
| 5,555,372 A | 9/1996 | Tetreault et al. | 395/182.13 |
| 5,574,865 A | 11/1996 | Hashemi | 395/283 |
| 5,581,750 A | 12/1996 | Haderle et al. | |
| 5,584,030 A | 12/1996 | Husak et al. | 395/750 |
| 5,586,253 A | 12/1996 | Green et al. | |
| 5,600,784 A | 2/1997 | Bissett et al. | 395/182.1 |
| 5,613,162 A | 3/1997 | Kabenjian | 395/842 |
| 5,615,403 A | 3/1997 | Bissett et al. | |
| 5,621,885 A | 4/1997 | Del Vigna, Jr. | |
| 5,627,965 A | 5/1997 | Liddell et al. | 395/185.01 |
| 5,630,046 A | 5/1997 | Loise | |
| 5,630,056 A | 5/1997 | Horvath et al. | 395/185.09 |
| 5,659,681 A | 8/1997 | Ojima | 395/183.19 |
| 5,671,443 A | 9/1997 | Stauffer et al. | 395/845 |
| 5,682,513 A | 10/1997 | Candelaria et al. | |
| 5,694,541 A | 12/1997 | Service et al. | |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,721,918 A | 2/1998 | Nilsson et al. | |
| 5,724,581 A | 3/1998 | Kozakura | |
| 5,737,601 A | 4/1998 | Jain et al. | 395/617 |
| 5,748,873 A | 5/1998 | Ohguro et al. | |
| 5,751,955 A | 5/1998 | Sonnier et al. | 395/200.19 |
| 5,758,065 A | 5/1998 | Reams et al. | 395/185.01 |
| 5,781,910 A | 7/1998 | Gostanian et al. | |
| 5,787,485 A | 7/1998 | Fitzgerald, V et al. | |
| 5,790,397 A | 8/1998 | Bissett et al. | |
| 5,790,775 A | 8/1998 | Marks et al. | |
| 5,802,265 A | 9/1998 | Bressoud et al. | |
| 5,809,256 A | 9/1998 | Najemy | 395/283 |

| | | |
|---|---|---|
| 5,812,748 A | 9/1998 | Ohran et al. ............ 395/182.02 |
| 5,815,647 A | 9/1998 | Buckland et al. ...... 395/182.01 |
| 5,828,903 A | 10/1998 | Sethuram et al. ............ 395/817 |
| 5,838,899 A | 11/1998 | Leavitt et al. ......... 395/185.09 |
| 5,838,900 A | 11/1998 | Horvath et al. ........ 395/185.09 |
| 5,838,993 A | 11/1998 | Riley et al. .................. 395/842 |
| 5,845,060 A | 12/1998 | Vrba et al. |
| 5,862,145 A | 1/1999 | Grossman et al. ............ 371/5.1 |
| 5,870,301 A | 2/1999 | Yakushiji et al. |
| 5,875,308 A | 2/1999 | Egan et al. .................. 395/283 |
| 5,875,351 A | 2/1999 | Riley ......................... 395/842 |
| 5,881,251 A | 3/1999 | Fung et al. ................. 395/283 |
| 5,890,003 A | 3/1999 | Cutts, Jr. et al. |
| 5,892,928 A | 4/1999 | Wallach et al. ............. 395/283 |
| 5,894,560 A | 4/1999 | Carmichael et al. ........ 395/845 |
| 5,896,523 A | 4/1999 | Bissett et al. |
| 5,903,717 A * | 5/1999 | Wardrop ...................... 714/12 |
| 5,918,229 A | 6/1999 | Davis et al. |
| 5,928,339 A | 7/1999 | Nishikawa ................... 710/26 |
| 5,933,838 A | 8/1999 | Lomet |
| 5,944,800 A | 8/1999 | Mattheis et al. .............. 710/23 |
| 5,953,538 A | 9/1999 | Duncan et al. ............. 395/842 |
| 5,956,474 A | 9/1999 | Bissett et al. |
| 5,956,476 A | 9/1999 | Ranson et al. ......... 395/183.06 |
| 5,963,745 A * | 10/1999 | Collins et al. ................ 712/13 |
| 5,968,185 A | 10/1999 | Bressoud et al. |
| 5,978,866 A | 11/1999 | Nain ........................... 710/22 |
| 5,982,672 A | 11/1999 | Moon et al. ........... 365/189.01 |
| 5,983,289 A | 11/1999 | Ishikawa et al. .............. 710/35 |
| 5,983,371 A | 11/1999 | Lord et al. |
| 5,991,900 A | 11/1999 | Garnett ....................... 714/56 |
| 5,996,035 A | 11/1999 | Allen et al. ................. 710/103 |
| 6,000,043 A | 12/1999 | Abramson ................... 714/44 |
| 6,009,535 A | 12/1999 | Halligan et al. |
| 6,012,120 A | 1/2000 | Duncan et al. ............. 710/129 |
| 6,021,456 A | 2/2000 | Herdeg et al. .............. 710/260 |
| 6,026,458 A | 2/2000 | Rasums ...................... 710/103 |
| 6,032,271 A | 2/2000 | Goodrum et al. ............ 714/56 |
| 6,038,685 A | 3/2000 | Bissett et al. |
| 6,041,375 A | 3/2000 | Bass et al. .................. 710/103 |
| 6,047,343 A | 4/2000 | Olarig ........................ 710/102 |
| 6,049,894 A | 4/2000 | Gates .......................... 714/41 |
| 6,055,584 A | 4/2000 | Bridges et al. ............... 710/27 |
| 6,062,480 A | 5/2000 | Evoy ........................ 235/492 |
| 6,065,017 A | 5/2000 | Barker |
| 6,065,135 A | 5/2000 | Marshall et al. |
| 6,067,550 A | 5/2000 | Lomet |
| 6,073,196 A | 6/2000 | Goodrum et al. ........... 710/103 |
| 6,085,200 A | 7/2000 | Hill et al. |
| 6,098,137 A | 8/2000 | Goodrum et al. ........... 710/129 |
| 6,119,128 A | 9/2000 | Courter et al. |
| 6,125,417 A | 9/2000 | Bailis et al. ................ 710/103 |
| 6,141,718 A | 10/2000 | Garnett et al. |
| 6,141,769 A | 10/2000 | Petivan et al. ................ 714/10 |
| 6,141,770 A * | 10/2000 | Fuchs et al. ................... 714/11 |
| 6,148,348 A | 11/2000 | Garnett et al. |
| 6,199,171 B1 | 3/2001 | Bossen et al. |
| 6,233,702 B1 | 5/2001 | Horst et al. |
| 6,289,022 B1 * | 9/2001 | Gale et al. .................. 370/412 |
| 6,357,024 B1 | 3/2002 | Dutton et al. |
| 6,374,365 B1 | 4/2002 | Lahmann |
| 6,393,582 B1 | 5/2002 | Klecka et al. |
| 6,604,177 B1 | 8/2003 | Kondo et al. |
| 6,615,366 B1 * | 9/2003 | Grochowski et al. ......... 714/10 |
| 6,622,193 B1 * | 9/2003 | Avery ......................... 710/263 |
| 6,636,933 B1 * | 10/2003 | MacLellan et al. ......... 710/317 |
| 6,643,763 B1 * | 11/2003 | Starke et al. .................. 712/11 |
| 6,643,764 B1 * | 11/2003 | Thorson et al. ............... 712/11 |
| 6,772,368 B1 | 8/2004 | Dhong et al. ................. 714/11 |
| 2001/0036181 A1 * | 11/2001 | Rogers ...................... 370/389 |
| 2002/0129296 A1 * | 9/2002 | Kwiat et al. .................. 714/10 |

FOREIGN PATENT DOCUMENTS

| | | |
|---|---|---|
| EP | 0 428 330 A2 | 5/1991 |
| EP | 0 475 005 B1 | 11/1995 |
| EP | 0 293 860 B1 | 2/1996 |
| EP | 0 742 507 A1 | 11/1996 |
| EP | 0 390 567 B1 | 6/1999 |
| EP | 0 974 912 A2 | 1/2000 |
| GB | 2 060 229 A2 | 4/1981 |
| GB | 2 268 817 A | 1/1994 |
| WO | WO 99/66406 | 12/1999 |

OTHER PUBLICATIONS

Nakamikawa et al., "High Performance Fault Tolerant Computer and its Fault Recovery," XP010257726, *IEEE Proceedings of Pacific Rim International Symposium on Taipei*, pp. 2-6 (Dec. 1997).

* cited by examiner

APPARATUS AND METHODS FOR FAULT-TOLERANT COMPUTING USING A SWITCHING FABRIC

FIELD OF THE INVENTION

This invention relates generally to fault-tolerant computer systems and more specifically to a method and apparatus for communicating data between elements of a fault-tolerant computer system.

BACKGROUND OF THE INVENTION

Present computer systems rely on communication bus architectures to communicate information between system components, such as between the central processor unit (CPU), memory, and input/output (I/O) devices. Many industry standards have developed defining the construction and operation of the bus and the communication signals on the bus, such as the Peripheral Components Interconnect (PCI), promoting interoperability among different computer system components offered by different hardware vendors that would otherwise not be interoperable. These standard busses include a shared physical connection interconnecting each of the system components, where each of the system components is addressable by some means.

The advantages of using a shared bus, however, result in some amount of unavoidable, operational inefficiencies. For example, if each system component is allowed unrestricted access to the bus, there will be instances where two or more system components attempt to simultaneously access the bus. Simultaneous access of the bus by two or more system components attempting to transmit during the same time period would result the respective transmit signals of each system component overlapping and becoming garbled. Such a scenario could result in the propagation of errors, or more likely, that each system component would need to re-send the same message again. To avoid multiple bus components attempting to transmit on the bus during the same time period, bus-design standards include some means of arbitration ensuring that only one system component transmits across the bus during a given time period.

In an arbitrated bus system, a bus arbiter receives requests for bus access from multiple system components and grants access to the bus to only one system component during one time period. Although this arbitration capability improves efficiency by eliminating the need to re-send data resulting from interfering transmissions by multiple system components, any benefit comes at the cost of additional overhead resulting from the arbitration procedure. Typically, an arbiter grants access for a predetermined time period or bandwidth window to whichever bus requester first requests use of the bus. If multiple bus requesters have requests for use of the bus pending, then the arbiter typically employs a rotational priority scheme to share the bus among the bus requesters. In a rotational priority scheme, the use of the bus is given for one bandwidth window to each bus requester in sequential order. Thus, the rotational priority scheme gives each bus requester the same amount of bus time as every other bus requester connected to the bus.

One problem with the prior art arbitration schemes is that each bus requester can only generate a single bus request at a time. That is because each bus requester must keep its first bus request active until the arbiter selects the bus request. Upon selecting the first bus request of a selected bus requester, the arbiter captures the selected bus request in a latch and then transmits the bus request on the computer bus when the computer bus becomes available. In addition, the arbiter transmits to the selected bus requester an acknowledgment indicating that selected bus request was captured. In response to receiving the acknowledgment from the arbiter, the selected bus requester can generate and transmit a second bus request to the arbiter. Each of the other bus requesters similarly must wait until its first bus request is selected before generating a second bus request. As such, high bandwidth bus requesters are prevented from generating bus requests at their optimum speed.

The present invention solves this problem.

SUMMARY OF THE INVENTION

The present invention relates to apparatus and methods for fault-tolerant computing using an asynchronous switching fabric architecture that increases the aggregate data rate between system components, maximizing overall I/O throughput by handling multiple I/O streams simultaneously. One embodiment of the invention comprises a plurality of redundant data processing elements where each of the redundant data processing elements is executing substantially identical instructions substantially simultaneously. This embodiment also comprises an asynchronous switching fabric and a target device, where the switching fabric communicates transactions between the target and at least one of the redundant data processing elements. In one aspect, the redundant data processing elements are executing each of the substantially identical instructions in lock-step synchronization. In another aspect, the target is a data processing element. In yet another aspect, each of the data processing elements and the target devices are interconnect to the asynchronous switching fabric using a channel adapter.

In another embodiment of the invention, each of the redundant data processing elements generates substantially identical transactions directed towards a target device. Each generated transaction includes a target address, and each of the generated transactions is communicated from at least one of the redundant data processing elements to a target through an asynchronous switching fabric. In one aspect, a voting device receives each of the substantially identical transactions from each of the redundant data processing elements and forwards a single transaction to the target device specified by the transaction address.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention may be better understood by referring to the following description taken in conjunction with the accompanying drawings in which:

DETAILED DESCRIPTION OF THE INVENTION

Figure 1:
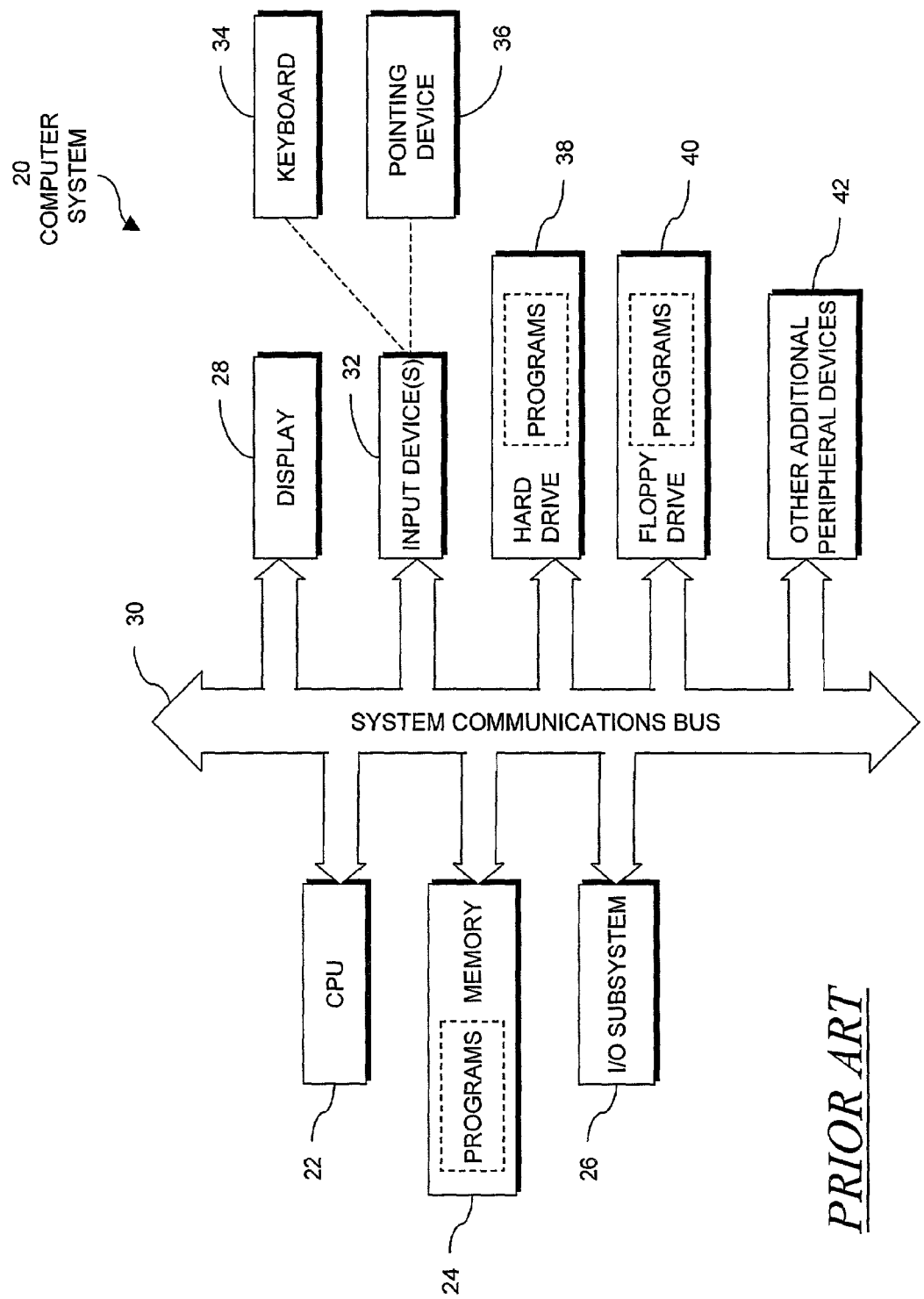
FIG. 1 is a block diagram of a prior art computer system.

Referring now to FIG. 1, a typical computer system 20 as known in the prior art includes a central processor unit (CPU) 22, a main memory unit 24 for storing programs and/or data, an input/output (I/O) subsystem 26, a display device 28, and a system communications bus 30 coupling these components to allow communication between these units. The memory 24 may include random access memory (RAM), read only memory (ROM), and one or more memory registers. The computer system 20 typically also has one or more peripheral devices, such as input devices 32 such as a keyboard 34 (e.g., an alphanumeric keyboard and/or other types of keyboards such as a reduced-key keyboard, or a musical keyboard), a computer pointing device 36 for translating user movements into computer gestures, such as a mouse, a track ball, a track pad, a digitizing tablet, and, in some embodiments, a joystick or data glove.

The computer system 20 typically also includes one or more storage devices, such as hard disk drive 38 and a floppy disk drive 40 for receiving floppy disks such as 3.5-inch disks. Other additional peripheral devices 42 also can be part of the computer system 20 including output devices (e.g., printer or plotter) and/or optical disk drives for receiving, reading, and/or writing digital data on a CD-ROM. In the disclosed embodiment, one or more computer programs shown in phantom define the operational capabilities of the computer system 20. These programs can be loaded onto the hard disk drive 38 and/or into the main memory 24 of the computer CPU 22 via the floppy disk drive 40. Applications may be caused to run by double-clicking a related icon displayed on the display device 28 using the computer-pointing device 36. In general, the controlling software program and all of the data utilized by the program are stored on one or more of the computer system's 20 storage mediums such as the hard disk drive 38, or the other additional peripheral devices 42, such as a CD-ROM.

The system communications bus 30 allows data to be transferred between the various components in the computer system 20. For example, the CPU 22 may retrieve program data from the main memory 24 over the system communications bus 30. Various system busses 30 are standard in computer systems 20, such as the Video Electronics Standards Association (VESA) Local Bus, the industry standard architecture (ISA) bus, the Extended Industry Standard Architecture bus (EISA), the Micro Channel Architecture bus (MCA) and the PCI bus. In some computer systems 20, multiple system communication busses 30 may be used to provide access to different units of the system 20. For example, a computer system 20 may use a PCI bus to connect a CPU 22 to peripheral devices 28, 34, 36, 38, 40, 42 and concurrently connect the CPU 22 to main memory 24 using an MCA bus.

It is immediately apparent from FIG. 1 that such a traditional computer system 20 is highly sensitive to any single point of failure. For example, if the main memory unit 24 fails to operate for any reason, the computer system 20 as a whole will cease to function. Similarly, should the system communications bus 30 fail, the computer system 20 as a whole will fail. A redundant, fault-tolerant system achieves an extremely high level of availability by using redundant components and data paths to insure uninterrupted operation. A redundant, fault-tolerant system may be provided with any number of redundant components. Some configurations include dual-mode redundant (DMR) systems, which include duplicates of certain hardware units found in FIG. 1, for example, duplicate, redundant CPUs 22 and main memory units 24 executing substantially identical instruction streams. Other configurations include triple-mode redundant (TMR) configurations, which include three of each of certain hardware units shown in FIG. 1, for example three redundant CPUs 22 and main memory units 24 executing substantially In brief overview, referring now to FIG. 2, one embodiment of a TMR, fault-tolerant computer system 20 is shown that includes three CPU boards 22, 22', 22'' (generally 22) and at least two I/O subsystems 26, 26' (generally 26), redundant communications busses 30, 30' (generally 30), redundant I/O subsystems 26'',26''' (generally 26), one or more first peripheral busses 64a through 64m (generally 64), one or more redundant first peripheral busses 64a' through 64m' (generally 64'), a patch panel 54, one or more second peripheral busses 64a'' through 64n'' (generally 64''), and one or more peripheral devices 42a through 42n (generally 42).

Each of the CPU boards 22 is in communication with the first I/O subsystems 26 through the first communications bus 30. Each of the CPU boards 22 is in communication with the second I/O subsystems 26' through the second, redundant communications bus 30'. The first I/O subsystems 26 is in further communication with the patch panel 54 through one or more first peripheral busses 64. For example, in one embodiment the first bus 64a is a video bus in communication with a display 28 peripheral device, while the second bus 64b is an ISA bus in communication with one or more input devices 32. Similarly, the second I/O subsystems 26' is in further communication with the patch panel 54 through one or more redundant first peripheral busses 64'. The patch panel 54 is in further communication with the peripheral devices 42 through the one or more second peripheral busses 64''. In some embodiments of a fault-tolerant computer system 20, the patch panel 54 interconnects one of the I/O subsystems 26 to the peripheral devices 42. In the event of a failure, the patch panel 54 allows the redundant I/O subsystem 26' to be connected to the peripheral devices 42 through a process known to those skilled in the art as "fail-over."

In some embodiments, the patch panel 54 provides an adapter function between the I/O subsystems 26 and the peripheral devices 42. For example, in one embodiment the patch panel 54 includes an adapter converting a first PCI bus 64 and a redundant first PCI bus 64' to a second universal serial bus (USB) 64''. The USB may be used by some peripherals 42, such as a keyboard and computer pointing input devices, or a video bus (e.g., enhanced graphics adapter (EGA), video graphics adapter (VGA), or super VGA (SVGA)) used for connecting the displays to the computer system 20.

In some embodiments, the system communication busses 30 and the peripheral busses 64, 64', 64'' are standard system busses such as those described for the computer system 20 illustrated in FIG. 1 (ISA, VESA, EISA, MCA, PCI, and the like). Examples of peripheral devices 42 include the peripheral devices previously identified in FIG. 1, e.g., a display device (e.g., a monitor), a hard disk drive, a CD ROM drive, one or more input device(s) (e.g., a keyboard or a computer pointing device), a printer, a plotter, and a floppy disk drive 40.

In another embodiment, the fault-tolerant computer system 20 includes more than two I/O subsystems (e.g., 26" and 26''' shown in phantom view) to allow the fault-tolerant computer system 20 to control additional peripheral devices 42. The additional I/O subsystems 26", 26''' are similarly in communication with the CPU boards 22 through additional communication busses 30" and 30''', also shown in phantom.

In one embodiment, the CPU boards 22 are redundant CPU boards 22 executing substantially identical instruction streams. The I/O subsystems 26 are redundant components configured in a fail-over mode. That is, at any instant in time, I/O communications between the CPU boards 22 and the peripheral devices 42 are communicated through one of the I/O subsystem 26, e.g., the first I/O subsystem 26. Whereas I/O communications between the CPU boards 22 and the peripheral devices 42 are not simultaneously communicated through the second I/O subsystem 26'. The second, I/O subsystem 26' remains ready to replace the first I/O subsystem 26 in the event of a failure. In one embodiment, the patch panel 54 includes switches to control which of the redundant I/O subsystems 26 is in communication with the peripheral devices 42. Fail-over of the I/O subsystems 26 is controller by fault-tolerant control elements discussed later in more detail.

In more detail, in one embodiment, each CPU board 22 contains at least one processor 44 and the main memory 24. In some embodiments, each CPU board 22 contains multiple processors 44, 44', 44", and 44''' (generally 44). In multiprocessor embodiments, each of the multiple processors 44 of a CPU board 22 may process different instruction streams. Respective processors 44 on different CPU boards 22 execute substantially identical instruction streams, and each processor 44 on a single CPU board 22 may execute its own instruction stream. In one embodiment, the processors 44 are selected from the "x86" family of processors manufactured by Intel Corporation of Santa Clara, Calif. The x86 family of processors includes the 80286 processor, the 80386 processor, the 80486 processor, and the Pentium®, Pentium® II, Pentium® III, and Pentium® III Xeon™ processors, and the 64-bit Itanium™ family of processors. In another embodiment processors are selected from the "680x0" family of processors manufactured by Motorola Corporation of Schaumburg, Ill. The 680x0 family of processors includes the 68000, 68020, 68030, and 68040 processors. Other processor families include the PowerPC™ line of processors manufactured by the Motorola Corporation, the Alpha line of processors manufactured by Compaq Corporation of Houston, Tex., the Crusoe™ line of processors manufactured by Transmeta Corporation of Santa Clara, Calif., and the Athalon™ line of processors manufactured by Advanced Micro Devices, Inc., of Sunnyvale, Calif.

In one embodiment, the redundant CPU boards 22 run in "lock-step," that is, each CPU board 22 runs substantially identical copies of the operating system and application programs and executes substantially identical instruction streams, substantially simultaneously, or in cycle-by-cycle synchrony. In lock-step operation, the data stored in the replicated main memory 24 provided by the replicated CPU boards 22 should be identical at all times. In some embodiments of a lock-step fault-tolerant computer system 20, a single reference clock source 48 (shown in phantom) is provided in communication with each of the CPU boards 22, and each of the CPU boards 22 is synchronized to the common clock source 48.

In other embodiments generally well known to those skilled in the art, the redundant CPU boards 22 run identical operating system and application programs and execute substantially equivalent instruction streams in a loosely synchronized, or "loose-stepped" manner. In a loose-step fault-tolerant computer system 20, each of the CPU boards 22 can include its own clock source 49, 49', 49" (generally 49) shown in phantom in FIG. 2, running asynchronously with respect to the clock sources 49 of the other CPU boards 22. Loose-step synchronization does not require the common clock source 48 used for lock-step embodiments.

In some embodiments of a loose-step fault-tolerant computer system 20, system synchronization is maintained by counting the instructions processed and initiating a synchronizing procedure after counting some quantum of the instructions. In other embodiments, system synchronization is maintained by monitoring events, such as memory references. In these embodiments any of the CPU boards 22 performing a monitored event before the remainder of the loose-stepped CPU boards 22 is stalled. Once the remainder of the CPU boards 22 perform the monitored event, the stalled CPU boards 22 are allowed to continue processing.

In some embodiments of a computer system 20, the communications busses 30 are split-communications busses. Referring now to FIG. 2B, a prior art computer system 20 implemented in a split-bus bus configuration includes a CPU 22, a CPU bus 56, a first bridge 60, a communications link 30, a second bridge 60', an I/O bus 58, and one or more peripheral devices 42. The CPU 22 is in communication with the first bridge 60 through the CPU bus 56. The first bridge 60 is in further communications with the second bridge 60' through the communications link 30. The second bridge 60' is in further communications with the peripheral device 42 through the I/O bus 58. In one embodiment, the CPU bus 56 and the I/O bus 58 are PCI busses and the bridges 60, 60' are PCI bridges. Other embodiments are possible where the busses 56, 58 are any of the standard busses, such as those previously identified, or proprietary busses.

The bridges 60, 60' and the communication link 30 offer flexibility to computer system design by allowing greater separation distances between the CPU 22 and the peripheral device 42, by allowing for the interconnection of CPU and I/O busses 56, 58 designed to different standards, and by allowing for communications with a greater number of peripheral devices 42.

Figure 3:
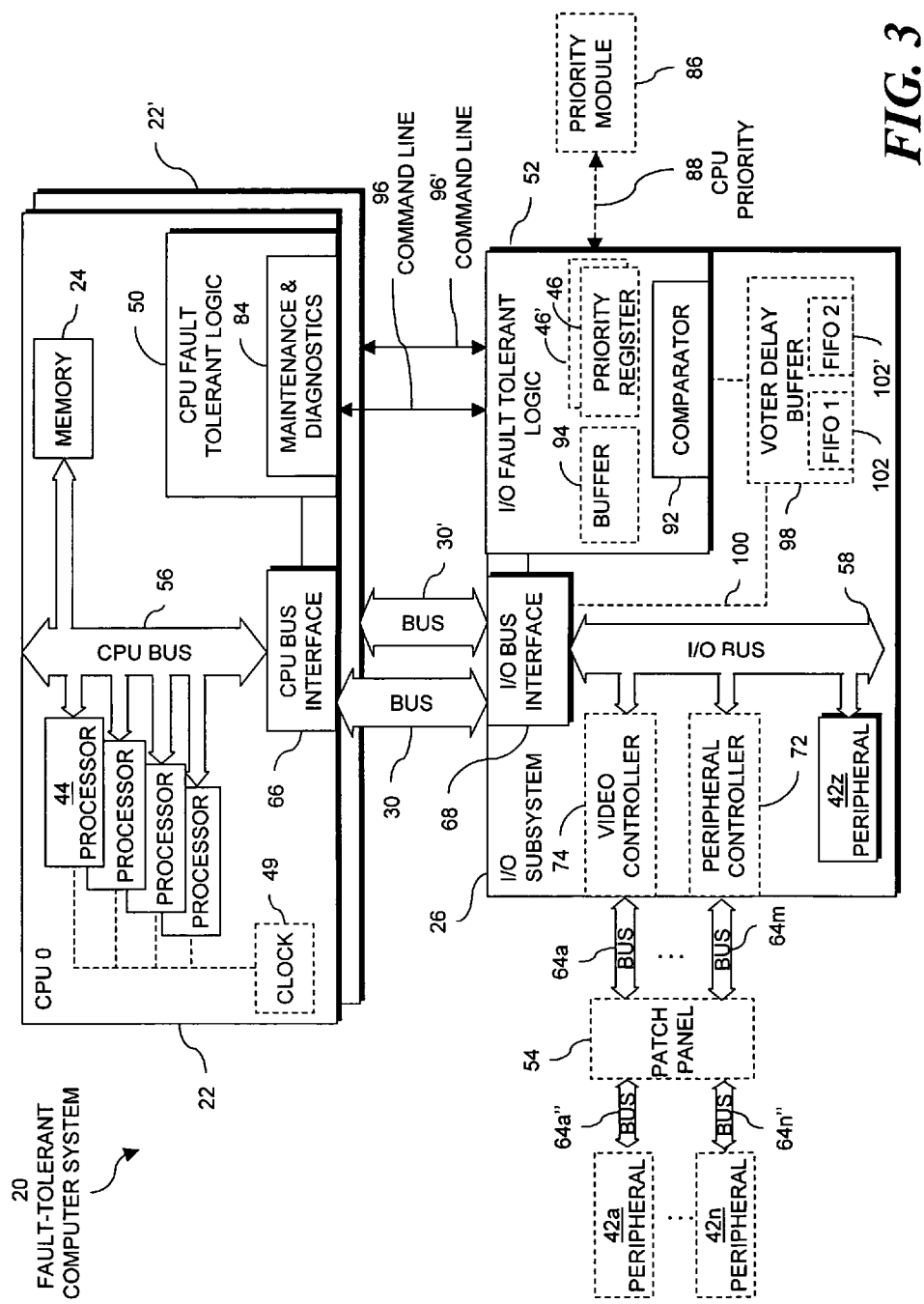
FIG. 3 is a more detailed block diagram of an embodiment of a fault-tolerant computer system.

In more detail and referring now to FIG. 3, some embodiments of a fault-tolerant computer system 20 employ a split-bus configuration. The split-bus, fault-tolerant computer system 20 includes at least a first redundant CPU 22 and a second redundant CPU 22', a first and second communications links 30 and 30', at least one I/O subsystem 26. In some embodiments, shown in phantom, one or more peripheral busses 64a, through 64m (generally 64) provide communications with one or more peripheral devices 42a, through 42n (generally 42). The redundant CPUs 22, 22' are in communication with the I/O subsystem 26 through the respective communications links 30, 30'. The I/O subsystems 26 are in further communications with one or more peripheral devices 42z through the I/O bus 58, and optionally through the peripheral busses 64. I/O instructions can be generated at each of the CPUs 22, or the peripheral devices 42 and can be directed at any of the other CPUs 22 or peripheral devices 42. The I/O instructions include memory read or writes, configuration read or writes, or other special instructions.

The I/O module 26 includes an I/O bus 58 and I/O bus interface. The I/O bus interconnects one or peripheral devices 42 to the I/O bus interface 68. In a split-bus embodiment, the I/O bus interface 68 includes a bridge function. In some embodiments, the I/O module 26 includes a video controller 74, and/or a peripheral controller 72, each shown in phantom. Each of the video controller 74, and/or the peripheral controller 72 has a first port and a second port. The first port of each of the video controller 74, and/or the peripheral controller 72 is in communication with the I/O bus 58. The second port of each of the video controller 74, and/or the peripheral controller 72 is in communication with the respective peripheral device 42 through the peripheral device bus 64. In some embodiments, an optional patch panel 54 can be included (also shown in phantom). The patch panel 54 offers local interconnections to peripheral devices 42 and can include a switching capability for fault-tolerant embodiments with redundant I/O modules 26 as show in FIG. 2A.

In one embodiment, the I/O module 26 includes I/O fault-tolerant logic 52. In some embodiments, the I/O module 26 also optionally includes a voter delay buffer 98, shown in phantom. In one embodiment, the I/O fault tolerant logic 52 is in communication with the I/O bus interface 68, and with the voter delay buffer 98, if present. In another embodiment, the I/O fault-tolerant logic 52 is implemented within the I/O bus interface 68, such as on a single ASIC. The I/O fault tolerant logic 52 functions to detect faults within the fault-tolerant computer system 20. In some embodiments, the I/O fault tolerant logic 52 compares the equivalent I/O instruction streams from each of the redundant CPUs 22 to identify a fault upon the detection of a miscompare.

In one embodiment, the I/O fault-tolerant logic 52 includes a comparator 92 that performs comparisons of the I/O instruction streams. As previously described, for lock-step fault-tolerant embodiments, the CPU instructions are substantially identical where the same instructions occur for each of the redundant CPUs 22 on the same clock cycle. In some lock-step embodiments, voting of the I/O instructions from the CPU 22 is conducted during each clock cycle.

In some embodiments the I/O fault-tolerant logic 52 also includes a buffer 94, shown in phantom. The buffer 94 can be used for holding I/O instructions from one or more of the redundant CPUs 22 in a loose-step fault-tolerant system 20. As previously described, the time of voting, or comparison, in a loose-step embodiment is determined by some event.

For either lock-step or loose-step embodiments, errors are identified where at least one of the inputs to the comparator 92 is different from the other equivalent, redundant inputs. In one embodiment, the comparator 92 substantially simultaneously performs a bit-by-bit comparison of the voted I/O instruction. When the comparator 92 inputs from each of the redundant CPUs 22 are identical at the time of voting, no errors are detected. In some embodiments of a lock-step fault-tolerant computer system 20 voting occurs during the clock cycle of the voted instructions. In other embodiments of a loose-step fault-tolerant computer system 20 voting occurs substantially coincident with a synchronizing event. In one embodiment, the redundant I/O instructions are stored in respective registers and voting occurs where the equivalent bits of each register are compared by a plurality of comparators, one for each bit of the instruction.

The I/O fault-tolerant logic 52 provides the fault-tolerant computer system 20 with a fault-tolerant capability. In some embodiments, the I/O fault-tolerant logic 52 is implemented as a separate set of logic on the I/O subsystem 26. For example, the I/O fault-tolerant logic 52 may be provided as an application specific integrated circuit (ASIC), a field programmable gate array (FPGA), an electrically erasable programmable read-only memory (EEPROM), a programmable read-only memory (PROM), a programmable logic device (PLD), or a read-only memory device (ROM). The I/O fault-tolerant logic 52 compares the results of each operation performed by the separate CPU boards 22 to the results of the same operation performed on one of the other CPU boards 22', 22". If the I/O fault logic 52 determines a discrepancy then a failure has occurred. In some embodiments, the CPU board 22 is a module, or chassis, while in yet other embodiments the CPU board 22 is a single chip where the CPU fault-tolerant logic 50 may be included on the chip itself.

Still referring to FIG. 3, one embodiment of a DMR fault-tolerant computer system is shown. The DMR fault-tolerant computer system 20 includes a priority module 86, shown in phantom, and the voter delay buffer 98. In one embodiment, the I/O fault-tolerant logic 52 includes a priority register 46, shown in phantom. In one embodiment, each CPU board 22 contains a CPU bus interface 66, and CPU fault-tolerant logic 50. The CPU fault-tolerant logic 50 is in communication with the CPU bus interface 66. The priority register 46 of the I/O fault-tolerant logic 52 is in communication with the priority module 86 through a CPU PRIORITY signal 88. In some embodiments, the CPU fault-tolerant logic 50 on each redundant CPU 22 is in communication with the I/O fault-tolerant logic 52 through a respective command line 96, 96'.

In one embodiment of a fault-tolerant computer system 20, the priority module 86 assigns a priority to each of the redundant CPUs 22. The assigned priority is stored in the priority register 46. The assigned priority may be updated or changed during operation by the I/O fault-tolerant logic 52, or by the priority module 86. The priority can be established by a number of factors, such as historical performance of the CPU 22 or prior/current diagnostic results from the maintenance & diagnostic module 84.

In one embodiment of a lock-step system 20, the I/O fault-tolerant logic comparator 92 performs a bit-by-bit cycle compare procedure on the data output streams passing into the I/O subsystem 26 on the I/O buses 30 and 30'. In another embodiment of a loose-step system 20, the I/O subsystem 26 includes buffer 94, shown in phantom, before the comparator 92, holds the transactions of the data output streams that will be compared from each of the redundant CPU boards 22. When each of the transactions to be compared from each of the respective redundant CPU boards 22 arrives at the buffer 94, the transactions are provided to the comparator 92. In either embodiment, lock-step, or loose-stepped, the comparator 92 may be, for example, an XOR gate or any other known component for comparing two bit values. If the cycle-compare procedure detects a difference between the two data output streams, this may be an indication that one of the CPU boards 22 and 22' is malfunctioning. Accordingly, the I/O subsystem 26 responds by issuing a "STOP" command to both the first CPU 22 and the second CPU 22' over a first command line 96 and a second command line 96' respectively.

When voting results in a miscompare within a DMR system 20, additional information is required to determine which CPU 22 should be taken off line as discussed below.

Once the defective CPU 22 is detected, in one embodiment, the I/O fault tolerant logic 52 generates a command to take the suspected faulty CPU 22, 22' off line. The command is communicated to the determined faulty CPU 22, 22' over the respective command line 96.

In one embodiment, the I/O fault-tolerant logic 52 determines which of the two redundant CPUs 22 is faulty by requesting that the maintenance and diagnostics module 84 of each redundant CPU 22 perform diagnostics to verify the integrity of the respective CPU 22. In some embodiments, when a fault is detected, the DMR fault-tolerant system 20 restricts the propagation of faulty data by issuing a STOP command to the CPUs 22 as described above. In response to the issued STOP command, the CPUs 22 halt instruction processing until diagnostics are completed. From the time that the fault-tolerant logic 52 issues a STOP command to the time that the CPUs 22 halt instruction processing in response to the issued STOP command, some number of instructions issued by the CPUs 22 may be received at the I/O subsystem 26. In response to the fault-tolerant logic 52 detecting a miscompare and issuing the STOP command, the I/O instructions from each of the two redundant CPUs 22 are re-directed to a respective first and second first-in-first-out buffer (FIFO) 102, 102' to prevent the propagation of corrupt data to other elements of the system 20. In one embodiment the FIFOs 102, 102' are located within the voter delay buffer 98. If one of the two CPUs 22 diagnoses a failure, that CPU 22 is taken off line for repair and replacement and any commands in the related FIFO 102, 102' are dumped, whereas the commands associated with the "good" CPU 22 are reissued from the respective FIFO 102, 102.

In another embodiment, where the I/O fault-tolerant logic 52 is unable to determine which CPU 22 is faulty, the I/O fault-tolerant logic 52 checks the priority register 46 for the priority value associated with each of the CPUs 22. The I/O fault-tolerant logic 52 then commands that the CPU 22 with the lower priority value be taken off-line. In yet another embodiment, combinations of results from the maintenance and diagnostics modules 84 and the priority values can be used by the fault-tolerant logic 50, 52 to determine which CPU 22 is suspected as being faulty.

Figure 4:
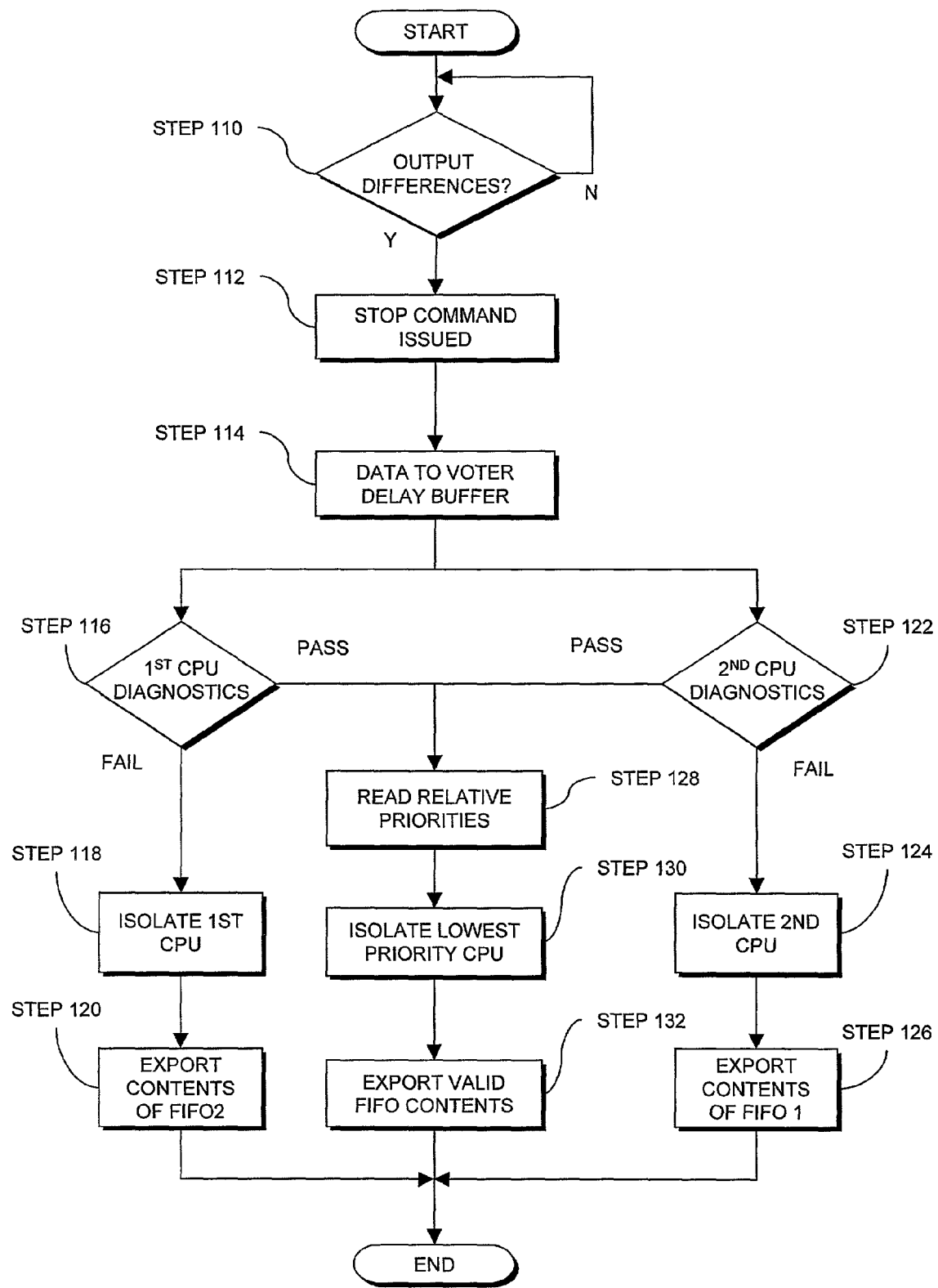
FIG. 4 is a flow diagram generally illustrating an embodiment of a process for handling errors in the fault-tolerant computer system shown in FIG. 2.

In operation, the fault-tolerant computer system 20 can best be described with reference to the flow diagram of FIG. 4. The data output streams on the I/O buses 30 and 30' are bit-by-bit compared by the comparator 92 (step 110) to provide a comparative reading from which it can be determined if there are differences between the monitored data output streams. If there are no such differences detected, the comparator 92 continues to monitor the data output streams. If differences are detected, the I/O fault-tolerant logic 52 issues a STOP command (step 112). In some embodiments, the issuance of a STOP command prompts the initiation of a CPU diagnostic procedure on each of the redundant CPUs 22 to check the status of each CPU 22. Subsequently, the data output streams on the I/O buses 30 and 30' are diverted to the voter delay buffer 98 (step 114).

The first CPU board 22 continues executing its ongoing diagnostic procedure (step 116). If the diagnosis indicates that the first CPU board 22 is malfunctioning, the first CPU board 22 is isolated (step 118) and operation of the computer system 20 continues with the second CPU board 22'. The data stored in the second FIFO 102' is output over the system I/O bus 30 (step 120) and thereafter subsequently processed data from the second CPU board 22' is output over the system I/O bus 30.

Contemporaneously with the ongoing diagnosis procedure in the first CPU board 22 (step 116) the second CPU board 22 also continues diagnosis (step 122). If, on the other hand, the resulting diagnosis indicates that the second CPU board 22' is malfunctioning, the second CPU board 22' is isolated (step 124) and operation of the computer system 20 continues with the first CPU board 22. The data stored in the first FIFO 102 is output over the system I/O bus 30 (step 126) and subsequent processed data from the first CPU board 22 is output over the system I/O bus 30.

If the diagnostic procedures fail to detect problems with either the first CPU board 22 or the second CPU board 22', the relative CPU priorities determined by the priority module 86 and maintained within the priority register 46 are used as the determinative factor. The relative CPU priorities are read from each of the priority registers 46, 46' to establish which of the first CPU board 22 or the second CPU board 22' has the higher priority (step 128). As discussed above, the relative priorities of the CPU boards 22 have been determined by one or more criteria, such as their operational histories or the comparative cumulative record of their internal error corrections. If the second CPU board 22' has been assigned the higher priority, for example, the computer system 20 selects the first CPU board 22 as the malfunctioning CPU board 22 and continues to operate with only the second CPU board 22' (step 130). Accordingly, the data stored in the second FIFO 102 is output (step 132) and so forth. On the other hand, if the first CPU board 22 has been assigned the higher priority, the computer system 20 selects the second CPU board 22' as the malfunctioning CPU board 22 and the operation of the computer system 20 continues with the first CPU board 22 (step 130). Subsequently, the data stored in the first FIFO 102 is output (step 132).

Figure 2A:
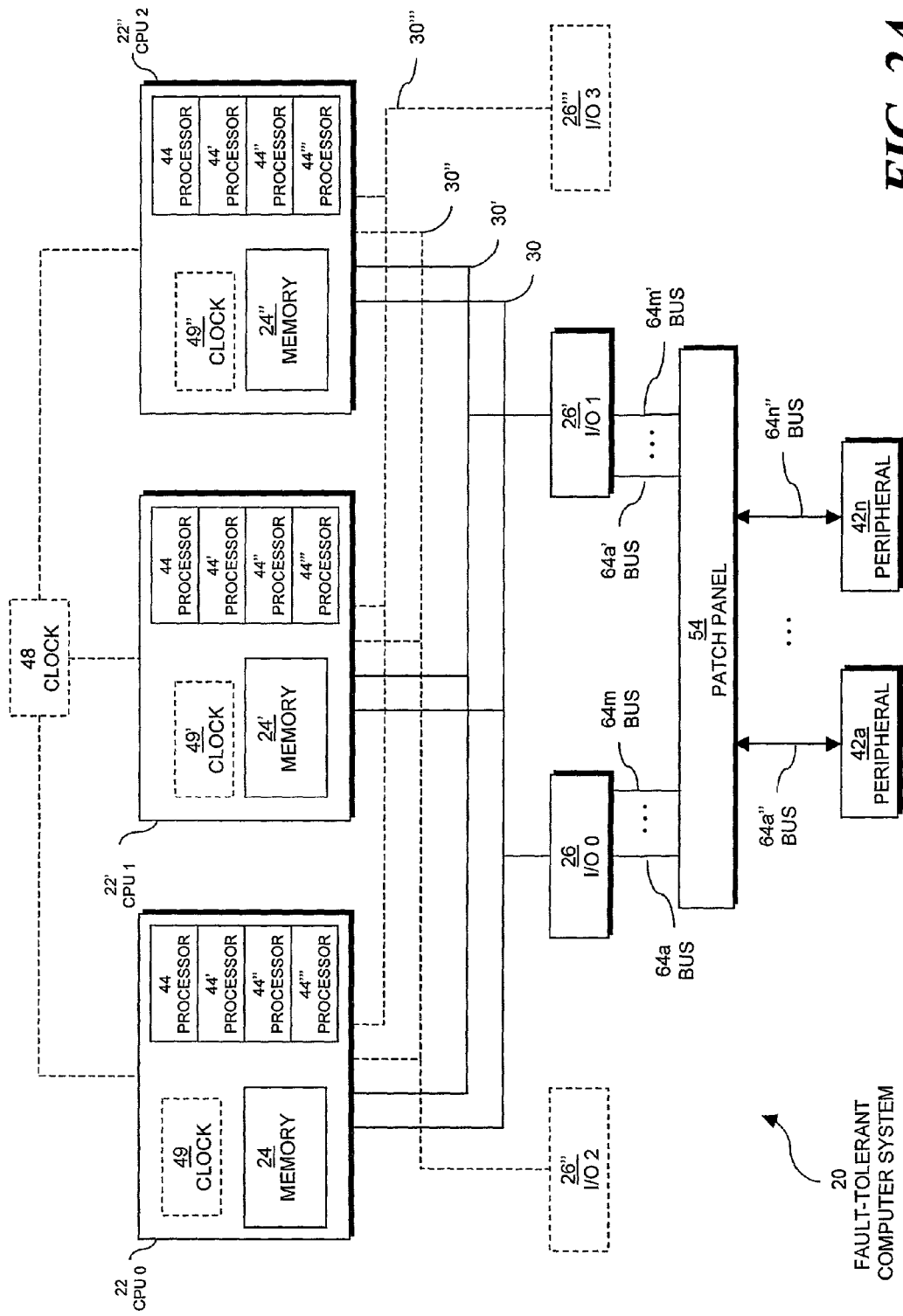
FIG. 2A is a block diagram of an embodiment of a fault-tolerant computer system.
Figure 2B:
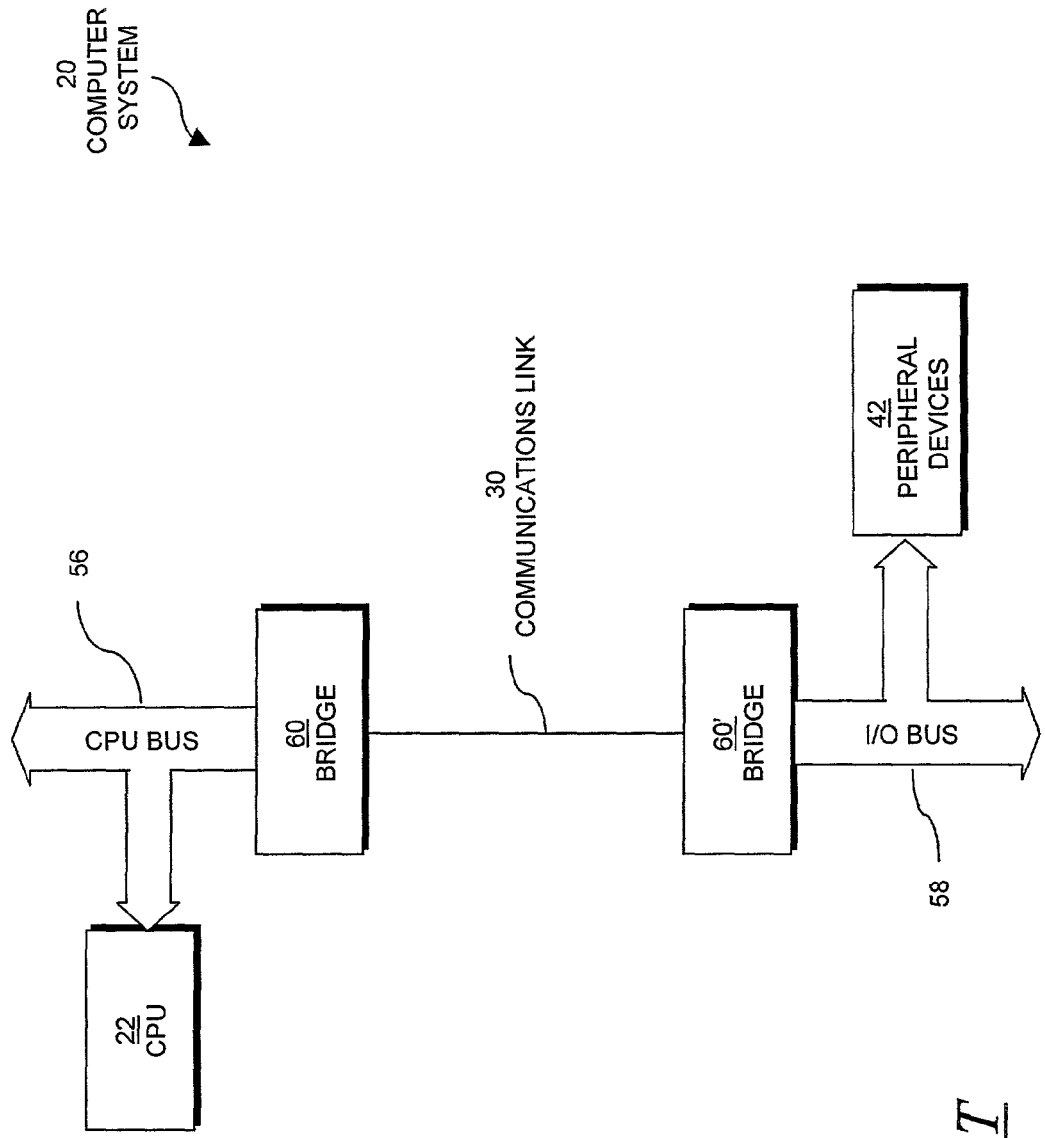
FIG. 2B is a block diagram of a prior art split-bus computer system.

One embodiment of a TMR fault-tolerant computer system 20 is similar to that shown in FIG. 2A with the internal detail of the CPU 22 and the I/O subsystem 26 shown in FIG. 3. In a TMR system, the I/O fault-tolerant logic 52 votes, or compares each of the input values of each I/O transaction generated by the three redundant CPUs 22 and received at the I/O bus interface 68 to determine if the three input instructions are not the same. In one embodiment, the voting constitutes a bit-by-bit comparison of each of the bits of the three redundant I/O instruction, performed within the comparator 92. Here, the comparison determines if all the inputs are the same, or, conversely, if one of the inputs is different from the other, and from that, identifies which one of the three differs from the others. In one embodiment, the comparator 92 is implemented in hardware. In another embodiment, the comparator 92 includes combinatorial logic. In another embodiment, the comparator is implemented in software. In one embodiment, when the comparator 92 determines a miscompare among the three input I/O instructions, the comparator 92 also identifies which of the three CPUs 22, referred to as the minority CPU 22, is not in agreement with the other two CPUs 22, referred to as the majority CPUs 22. I/O fault-tolerant logic 52, the majority value is determined to be the correct valid instruction and the minority is determined to be faulty. The I/O fault tolerant logic 52 commands that the suspected faulty CPU 22 be taken off line. In some embodiments of a TMR fault-tolerant system, there is no priority module 86 and no voter delay buffer 98 since identification of the faulty CPU 22 is determine to be the minority CPU in a triple-valued compare. In some embodiments of a TMR fault-tolerant computer system 20, the priority module and priority register 46 can also be used to make further determinations of identifying a failed CPU 22 in a miscompare. In other embodiments of a TMR fault-tolerant computer system 20 the maintenance and diagnostic module 84 and voter delay buffer 98 can also be used to make further determinations of identifying a failed CPU 22 in a miscompare. In yet other embodiments, the TMR fault-tolerant computer system 20 will function as the previously identified DMR fault-tolerant computer system 20 when one of the three CPUs 22 has been taken off-line leaving two remaining on-line CPUs 22.

Figure 5:
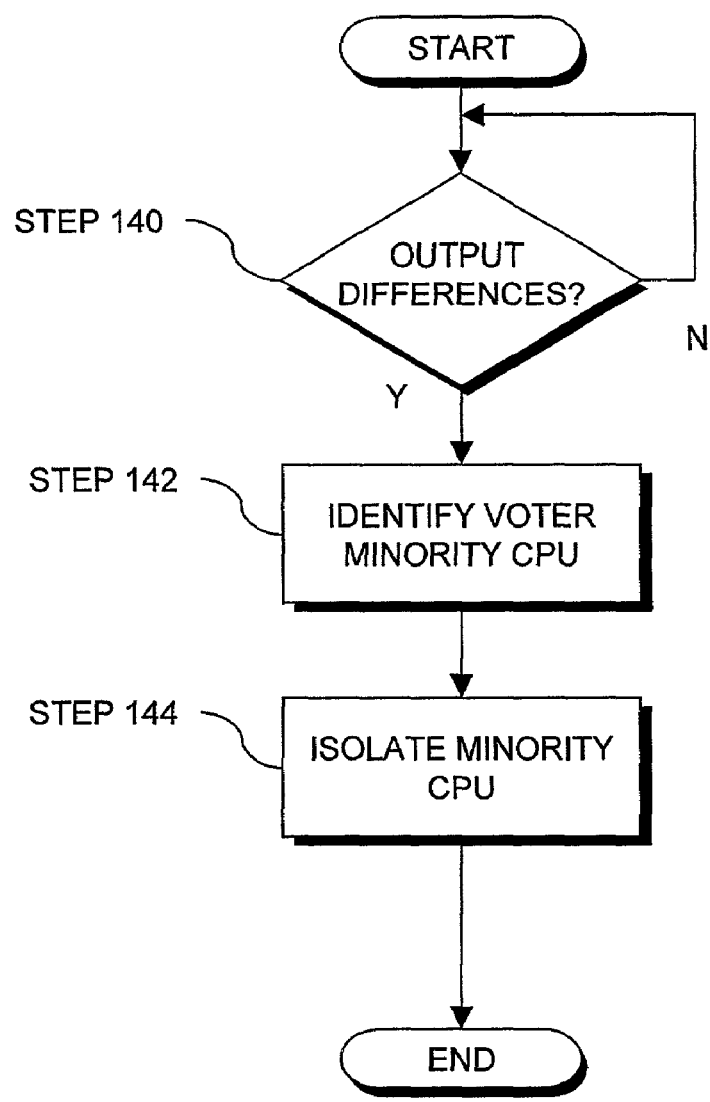
FIG. 5 is a flow diagram generally illustrating an embodiment of a process to identify and isolate a faulty CPU.

In operation, referring to FIG. 5, in one embodiment of a TMR fault-tolerant computer system 20, the I/O fault-tolerant logic 52 compares I/O transactions from each of the CPU boards 22, 22', 22" (step 140). In the TMR system 20, the I/O fault-tolerant logic comparator 92 performs a voting function by comparing each of the instruction streams by a bit-by-bit comparison and identifying a minority CPU board 22 that produces an I/O instruction stream that does not match the I/O instruction stream from the majority (step 142)—the other two CPU boards 22', 22" in a TMR system. The minority CPU board 22 is then taken off-line to avoid the propagation of errors into the system and to allow for diagnostics, repair and replacement of the identified minority CPU board 22 if necessary (step 144).

Discussing the operation in further detail, when the I/O fault-tolerant logic 52 issues a STOP command in response to the detection of a miscompare, the I/O subsystem 26 stops transmitting output data on the I/O bus 58 and routes the data output streams on the buses 30 and 30' to a voter delay buffer 98 via a delay buffer line 100. Specifically, the data received from the first CPU board 22 is sent to a first FIFO 102, and the data received from the second CPU board 22' is sent to a second FIFO 102'. This action serves to prevents the peripheral devices from being sent data which may have been corrupted by the malfunctioning CPU board 22, and also serves to save data which otherwise may have been lost or discarded while the malfunctioning CPU board 22 was being identified. In one embodiment, the fault-tolerant logic 50, 52 identifies a faulty CPU 22 and notifies the voter delay buffer which CPU 22 is faulty. The voter delay buffer 98 then releases the buffered commands from the respective FIFO 102, 102' for the valid CPU 22 and normal processing continues.

In a preferred embodiment, the maintenance and diagnostic subsystems 84 and 84' continually run their respective diagnostic procedures. It should be understood that, even after the STOP command has been issued to the CPU boards 22 and 22', the I/O subsystem 26 continues to forward input data streams sent by the peripheral devices to the CPU boards 22 and 22'. The CPU boards 22 and 22' continue to process the data while running the diagnostic procedures, in accordance with normal operational procedures. The peripheral devices thus see the fault-tolerant computer system 20 as functioning normally.

Figure 6:
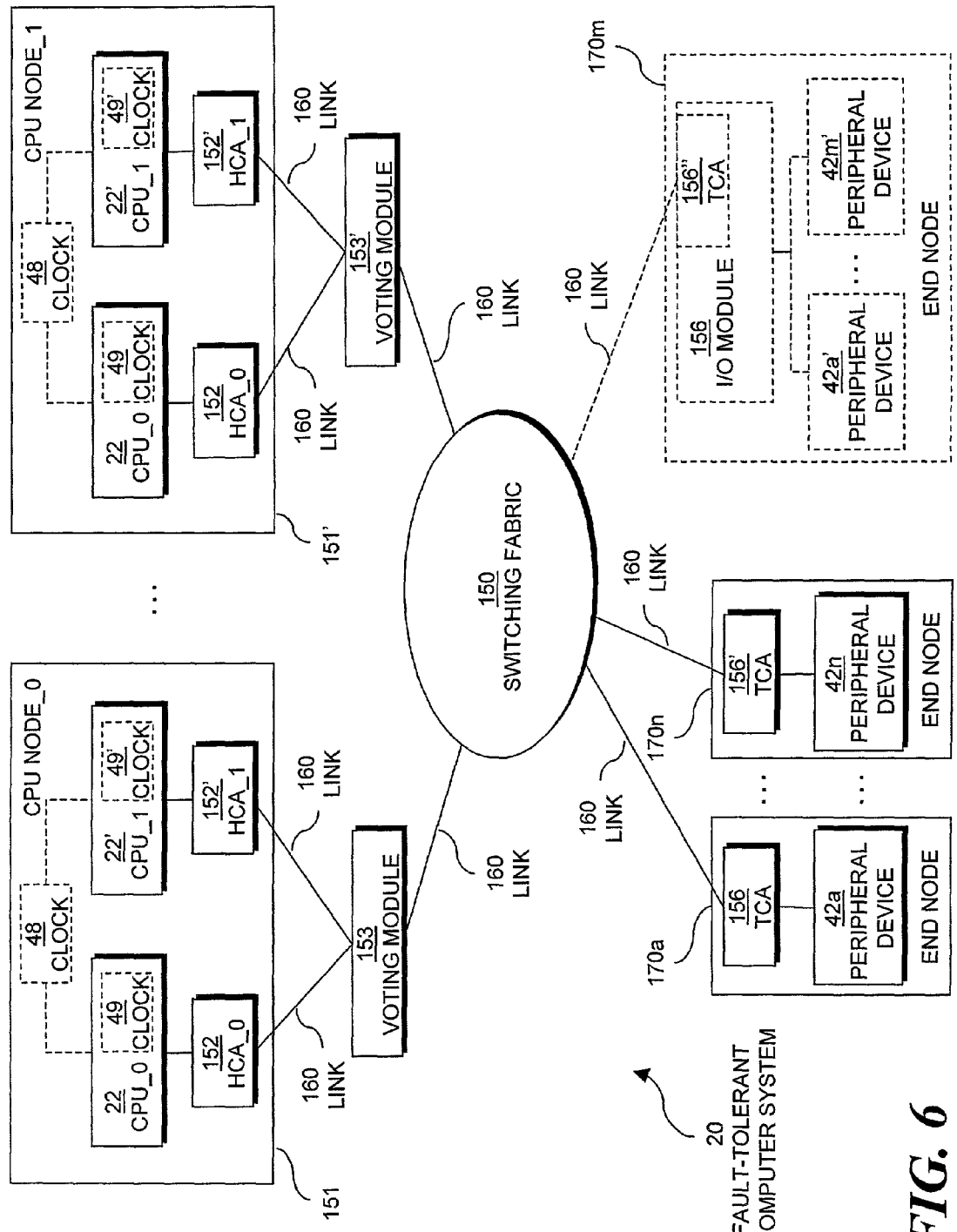
FIG. 6 is a block diagram of an embodiment of a fault-tolerant computer system using a switching fabric.

Referring to FIG. 6, in an alternative embodiment of a fault-tolerant computer system 20, the redundant system communications busses 30 between the CPU boards 22 and the I/O modules 26 shown in FIG. 2A and FIG. 3 are replaced by communication links 160 and a switching fabric 150. The switching fabric 150 provides a means for communicating instructions and data between end nodes of the computer system 20. End nodes of the system 20 include CPU 22 end nodes and I/O end nodes 170, each associated with one or more peripheral devices 42.

In one embodiment of a fault-tolerant computer system 20, the system includes a first and second CPU nodes 151 and 151' (generally 151), one or more I/O nodes 170a, . . . 170n, 170m (generally 170), the switching fabric 150, and a first and second voting module 153, 153' (generally 153). Each of the end nodes 151, 170 is in communication with the switching fabric 150 through at least one communications link 160. The switching fabric 150 includes network components, such as switches, routers, repeaters, and transceivers interconnected through communications links 160. The communications links 160 may be serial communication links, parallel links, or broadband links. The communications links 160 may be implemented with "twisted-pair" cable, coaxial cable, fiberoptic cable, or wireless links, such as radio links or free-optics links.

In one embodiment the system includes at least one target channel adapter (TCA) 156 and at least one host channel adapter (HCA) 152. A TCA 156 is a channel adapter specifically configured for use at an end node including a peripheral device 42. An HCA 152 is a channel adapter specially configured for use at an end node including a CPU 22. In one embodiment, the switching fabric 150 is an INFINIBAND™ switching fabric 150 and the HCAs 152 and TCAs 156 are defined by the INFINIBAND™ standard. In another embodiment, the switching fabric 150 is an Ethernet switched fabric in a network using a transmission control protocol over internet protocol (TCP/IP) or other transmission protocol. In another embodiment, the switching fabric 150 is a packet switched fabric in a network using X.25, frame relay, ATM or other transmission protocol. In another embodiment, the switching fabric 150 is a circuit switched fabric, such as a wired circuit switched fabric in a wired network, a wireless circuit switched fabric in a wireless network, or a combination circuit switched fabric having elements of both wired and wireless circuit switched fabrics in a combination network. In yet another embodiment, the switching fabric 150 is an American National Standards Institute (ANSI) Fibre Channel switching fabric in a network using a fibre channel transmission protocol.

In more detail, each of the end nodes 151, 170 is interconnected to the switching fabric 150 through a channel adapter (e.g., a host channel adapter (HCA) 152 or a target channel adapter (TCA) 156). Some examples of channel adapters 152, 156 include a model number PWLA8490T, available from Intel Corporation of Santa Clara, Calif., for a Gigabit Ethernet switching fabric 150, and a model number QLA2200, available from Qlogic Corporation of Aliso Viejo, Calif., for a Fibre Channel switching fabric 150. In one embodiment, the channel adapters 152, 156 translate communication messages between a first message format, such as for an I/O instruction (e.g., a PCI memory write instruction) and a second message format, such as for a transport message (e.g., a "packet" or series of packets). In one direction, each of the HCA 152 and the TCA 156 translates information received on a respective device port from an I/O format (e.g., PCI) to a switching-fabric format (e.g., INFINIBAND™) and provides the switching-fabric formatted message as an output on the switching-fabric port. Likewise, in another direction, each of the HCA 152 and the TCA 156 translates messages received on the switching-fabric port from a switching-fabric format to an I/O format and provides the I/O formatted message as an output on the device port (i.e., CPU port for an HCA 152, peripheral port for a TCA 156).

In one embodiment, an instruction, such as an I/O instruction, is generated at one of the end nodes 151, 170. The instruction may be an I/O read or write, a memory read or write, a configuration read or write, or other special instruction. Where the instruction is an I/O instruction, a target address is included. In some embodiments, each of the channel adapters 152, 156 has associated with it an address.

In one embodiment a device port of each channel adapter 152, 156 is in communication with one of the CPU boards 22, including the processors 44 and memory 24 contained thereon, or with a peripheral device 42, respectively. A switching-fabric port of each channel adapter 152, 156 is in communication with the switching fabric 150 through the respective communications link 160.

The channel adapter 152, 156 functions bidirectionally. In one direction, the channel adapter 152, 156 receives a source instruction (e.g., I/O instructions) from the respective source end node 151, 170. The source channel adapter 152, 156 determines the end node address corresponding to the recipient device (i.e., the address of the channel adapter 152, 156 associated with the recipient device). The channel adapter 152, 156 transmits each of the generated transport messages to the switching fabric 150. The switching fabric 150 directs the switching-fabric formatted messages through any one of a plurality of paths through the internal networking devices and links 160 of the switching fabric 150 to the addressed recipient channel adapter 152, 156. The source channel adapter 152, 156 affixes a destination switching-fabric address to each of the one or more packets of the source instruction and the addressed recipient channel adapter 152, 156 removes the switching-fabric address from each of the one or more packet of the received instruction. The source channel adapter 152, 156 may include additional information in the one or more packets of the I/O instruction, such as packet ordering information; instruction, or packet priority information; and error detection and control information, such as a checksum, or parity information. In one embodiment, at the recipient end node 151, 170, a channel adapter 152, 156 functions in a second direction receiving the one or more switching-fabric formatted messages from the switching fabric 150, through the communications link 160. The recipient channel adapter 152, 156 translates the one or more switching-fabric formatted messages into the source instruction format and provides the regenerated source instruction to the target device.

In one embodiment of a fault-tolerant computer system 20, each CPU node 151 includes the plurality of redundant central processor boards 22, 22' (generally 22), each associated with a respective host channel adapter (HCA) 152, 152' (generally 152). In one embodiment of a lock-step fault-tolerant computer system 20, a common clock source 48 (shown in phantom) is provided and used in a manner similar to that described for FIG. 2. In one embodiment of a loose-step fault-tolerant computer system 20, a plurality of unsynchronized clock sources 49, 49' (generally 49) (also shown in phantom) are provided and associated with each of the redundant CPU boards 22.

The redundant fault-tolerant computer system 20 shown in FIG. 6 is similar to the redundant system illustrated in FIG. 3 in that the redundant CPUs 22 execute substantially identical instructions and I/O instructions directed from the CPUs 22 to a peripheral device 42 or to another CPU 22 are routed through a module where they are compared cycle-by-cycle. If the comparison is successful, meaning that the I/O messages from the CPUs 22 are substantially identical, then one of the redundant I/O instructions is forwarded to its intended target node 151, 170. If the comparison is not successful, one of the CPUs 22 is presumed faulty, identified by fault-tolerant logic (not shown), and taken off line. In FIG. 3, the I/O instruction voting occurred in the I/O subsystem 26. In one embodiment of a switching fabric, voting occurs in a voter module 153. In another embodiment of a fault-tolerant computer system 20 including a switching fabric 150, the fault-tolerant logic is located within the voting module 153. In one embodiment communication of fault-tolerant information between the fault-tolerant logic and the CPU boards 22 is accomplished in-band, using suitably formatted switching fabric messages. In another embodiment communication of fault-tolerant information between the fault-tolerant logic and the CPU boards 22 is accomplished using a out-of-band signal provided over a separate communications path, such as a proprietary high-speed serial bus.

The embodiment of a fault-tolerant computer system 20 with a switching fabric 150 differs from the embodiment discussed in FIG. 3 in the nature of the commands that are voted. In FIG. 3, the comparator 92 of the I/O fault-tolerant logic 52 compared each source I/O instruction directed from the redundant CPUs 22 (e.g. a PCI instruction), whereas the voting module 153 of FIG. 6 compares the transport messages, or packets (e.g., INFINIBAND™ packets) being communicated from the HCAs 152 associated with each of the redundant CPUs 22.

In one embodiment, the transport messages, or packets, are communicated asynchronously across the switching fabric 150. Here, asynchronous means that the clock source of each of the end nodes 151, 170 operate independently from the clock sources of the other end nodes 151, 170, and also independently of the switching fabric clock source. Asynchronously also indicates that in some embodiments, data packets can be communicated across the switching fabric 150 intermittently where the intervals of any time delay between the communicated packets of the I/O transaction is variable. The variable delay and the nature of message routing where different packets of the same instruction may be routed through different paths within the switching fabric 150, thereby arriving at the TCA 156 in a different sequence than their sequence at the HCA 152. In some embodiments, the packet includes a packet header containing information relating to the proper sequence of the packets, aiding in reconstructing the I/O transactions.

In one embodiment, each of the respective recipient HCAs 152 and TCAs 156 performs destination conditioning of the messages received from the switching fabric 150. Destination conditioning includes one or more of the following: receipt of the one or more switching fabric packets of the related I/O instruction; error detection and control; removal of the affixed destination address; and reassembly of the one or more switching fabric packets of the related I/O instruction into the CPU-generated I/O instruction. Alternatively, the destination HCA 152 or TCA 156 may perform a translation of the I/O instruction from the source format, such as PCI to a different destination format, such as USB.

Figure 7:
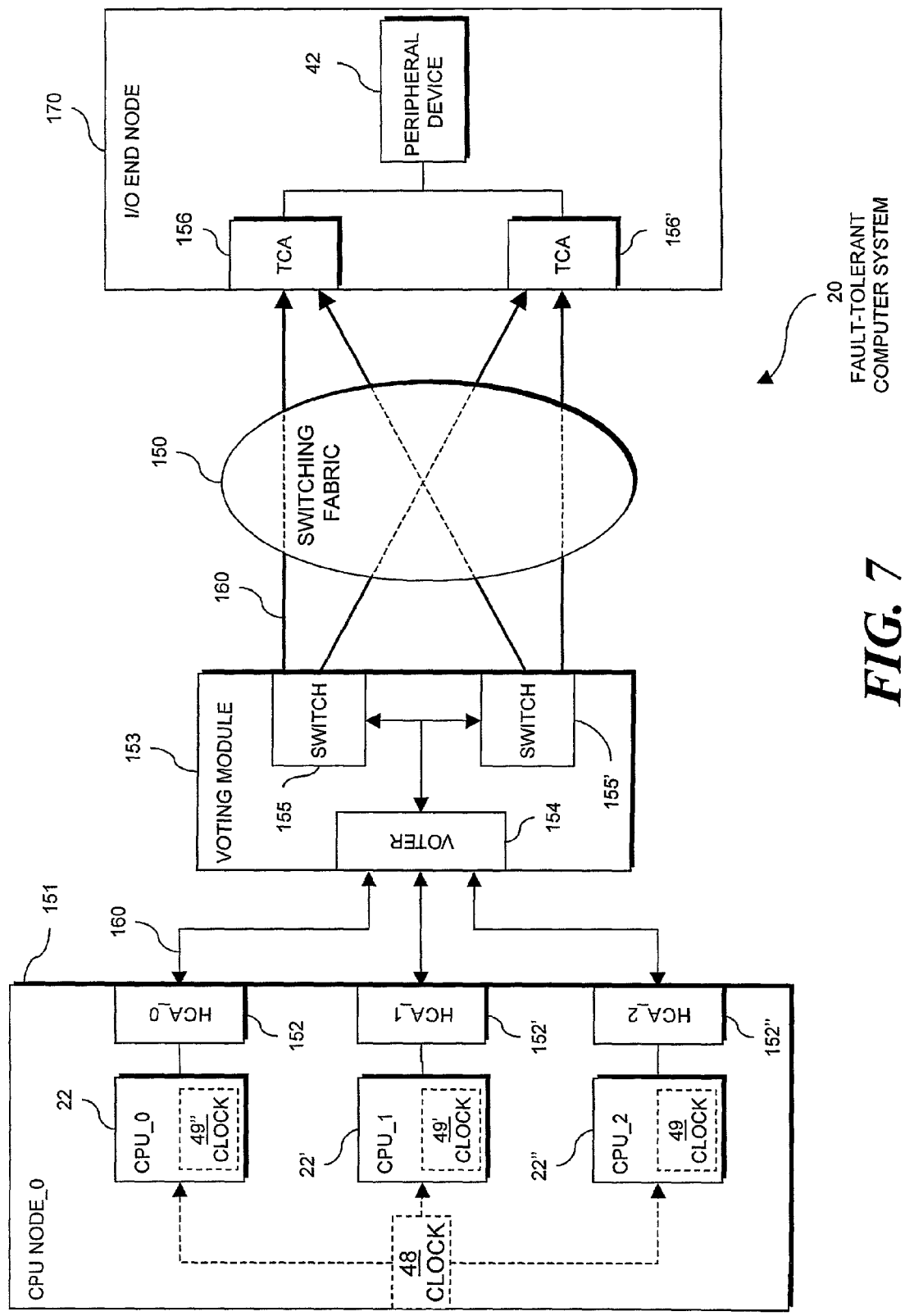
FIG. 7 is a block diagram of an embodiment of a CPU node communicating with a peripheral device using a switching fabric.

In more detail, referring to FIG. 7, one embodiment of a fault-tolerant computer system 20 includes redundant communications paths between the CPU node 151, the voting module 153, and the I/O end node 170. In one embodiment, the CPU node 151 includes multiply redundant (i.e., TMR) CPU boards 22, 22', 22" (generally 22), wherein each of the redundant CPU boards 22 is associated with a respective HCA 152, 152', 152" (generally 152). The I/O output port of each CPU board 22 is connected to a device port of the respective HCA 152. A switching-fabric port of each of the respective HCAs 152 is connected to the voting module 153 through a respective communications link 160.

In one embodiment, the voting module 153 includes a voter, 154 a first switch 155 and a second switch 155' (generally 155). The voter has one input port for each of the redundant CPUs 22 (i.e., three inputs for a TMR system 20) and one output port. The output port is connected to an input port of each of the two switches 155, 155'. Each of the switches 155 has two output ports. Each of the output ports of the switch is further connected to a respective port of the switching fabric 150 through a respective communications link 160. Substantially the same information is presented on each of the two output ports of either of the switches 151 such that the two communications links 160 provide redundant paths to the destination node 151, 170. In one embodiment, if either of the switches 155 should fail, the other redundant switch continues to provide redundant connectivity to the switching fabric 150.

In one embodiment, the I/O end node 170 includes two redundant TCAs 156, 156'. In one embodiment, messages to and from the I/O end node 170 are routed through each of the TCAs 156, 156'. The switching fabric port of each of the TCAs 156, 156' connects to the switching fabric through a respective communications link 160. The device port of each of the TCAs 156, 156' is connected to the one or more peripheral devices 42. The result is a redundant communications path between the CPU node 151 and the peripheral device 42 through the switching fabric 150. Exemplary paths through the switching fabric 150 are illustrated as phantom lines—actual redundant paths through the switching fabric 150 would depend upon the geometry of the switching fabric 150 and the state of the switching fabric components at the time of the message transfer.

In operation, for CPU-generated instructions, each of the redundant CPU boards 22 sends the substantially simultaneous instruction streams to its respective HCA 152, which in-turn formats the message into a switching-fabric format. In one embodiment, each of the HCAs 152 is synchronized to a common clock source (e.g., clock 48). The switching-fabric formatted messages are provided to the separate CPU ports of the voting module 153. In some embodiments using a loose-stepped CPU-synchronization scheme, an additional buffering stage can be provided within the voter to allow instructions from one CPU board 22 to be stored and synchronized with the substantially identical instruction from the redundant CPU boards 22 and clocked to the voter 154 at substantially the same time. Where the process of voting redundant CPU-generated messages results in no mis-compares each of the redundant CPU-generated messages is presumed valid. One of the presumed valid redundant CPU-generated messages is then forwarded to the switch 155 where it is farther forwarded to the switching fabric 150 over one or more communication links 160, wherein each of the communication links 160 is in communication with a respective port on the switching fabric 150. The switching fabric 150 also receives the recipient address from the switching fabric 150 formatted message and routes the message to its ultimate destination as described earlier referring to FIG. 6.

In one embodiment, voting of the switching fabric messages, or packets, is performed in a manner similar to that previously described for the non-switching fabric DMR and TMR fault-tolerant systems: identifying an error; determining a faulty CPU 22; taking the faulty CPU 22 off-line for diagnostics, repair, and replace; and continuing with system operation with little or no interruption to service.

In one embodiment, the CPU boards 22 of the fault-tolerant system 20 are configured with the same switching fabric node address. Where any one of the CPU boards 22 is the recipient of an instruction, the switching fabric 150 forwards the message to the voting module 153 associated with the recipient CPU 22. In one embodiment, the voting module 153 synchronizes the received switching fabric message to a timing source associated with the CPU node 151 and substantially simultaneously forwards the received message to each of the HCAs 152. The HCAs 152, in turn, convert the switching fabric messages into the intended I/O message and forward the received message to each of the redundant CPU boards 22 substantially simultaneously.

In some embodiments of a fault tolerant system 20, messages are directed to one or more of the individual CPU boards 22, individually (e.g., during a duplexing operation where an off-line CPU board 22 is being synchronized with memory and/or state information from another of the online CPU boards 22). In one embodiment, each of the HCAs 152 of a redundant CPU node 151 are configured with individual address. Inter-CPU messages are routed from the source device, to the switching fabric 150 through the voting module 153, and from the switching fabric 150, back through the voting module 153 to the individually addressed CPU board 22. Where the HCAs 152 of the redundant CPU boards 22 have individual addresses, messages directed from the I/O end node 170 to a CPU node 151 are configured with a broadcast address that includes each of the individual addresses of the CPU boards 22 included in the recipient CPU end node 151.

In another embodiment, each of the CPU boards 22 of a CPU end node 151 are configured with the same address and a TCA 156 is included within the voting module 153. Messages directed to all of the redundant CPU boards 22 are provided with the common address and routed through the voting module to the destination CPU boards 22. Messages intended for a particular one the CPU boards 22, such as synchronization messages, are directed to the TCA 156 within the voting module 153 associated with the target CPU board 22. The TCA 156 then routes the message to the intended CPU board 22.

In yet another embodiment, a separate communications is used for CPU synchronization messages, such as a proprietary high-speed serial bus.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A fault-tolerant data processing apparatus comprising:
a plurality of data processing elements executing substantially identical instruction streams on identical data streams substantially simultaneously;
an I/O node in communication with at least one of the plurality of data processing elements;
a switching fabric communicating transactions asynchronously between at least one of the plurality of data processing elements and the I/O node; and
a plurality of voter delay buffers wherein each of the plurality of voter delay buffers is in communication with at least one of the plurality of data processing elements.

2. The apparatus of claim 1 wherein each of the plurality of data processing elements comprises a Central Processing Unit (CPU).

3. The apparatus of claim 2 wherein the CPU further comprises a plurality of processors.

4. The apparatus of claim 1 wherein a channel adapter interconnects the I/O node to the switching fabric.

5. The apparatus of claim 1 wherein a plurality of channel adapters interconnect, respectively, each of the plurality of data processing elements to the switching fabric.

6. The apparatus of claim 1 further comprising a plurality of direct memory access (DMA) engines in communication with the switching fabric.

7. The apparatus of claim 1 wherein the plurality of data processing elements are identified by a node address.

8. The apparatus of claim 1 wherein each of the plurality of data processing elements is individually identified by a respective device address.

9. The apparatus of claim 1 wherein the transaction comprises at least one information packet.

10. A fault-tolerant data processing apparatus comprising:
a plurality of data processing elements executing substantially identical instruction streams substantially simultaneously;
an I/O node in communication with at least one of the plurality of data processing elements; and
a switching fabric communicating transactions asynchronously between at least one of the plurality of data processing elements and the I/O node;
wherein the plurality of data processing elements execute the same instruction in lock-step synchronization.

11. A method for fault-tolerant digital data processing comprising:
(a) generating, by a plurality of data processing elements, identical transactions on identical data streams, each transaction having an I/O node address; and
(b) communicating the identical transactions asynchronously on a switching fabric to the I/O node-identified by the I/O node-address;
wherein step (b) comprises:
(b-a) communicating identical transactions to a voting unit; and
(b-b) transmitting by the voting unit a single transaction asynchronously on a switching fabric.

12. A fault-tolerant data processing apparatus comprising:
a plurality of data processing elements executing substantially identical instruction streams substantially simultaneously;
a voting module in communication with the plurality of data processing elements for comparing the I/O instructions associated with at least two of the plurality of data processing elements;
an I/O node in communication with the voting module; and
a switching fabric communicating transactions asynchronously between the voting module and the I/O node.

13. The apparatus of claim 12 wherein the plurality of data processing elements execute the same instruction in lock-step synchronization.

14. The apparatus of claim 12 wherein a channel adapter interconnects the I/O node to the switching fabric.

15. The apparatus of claim 12 wherein at least one channel adapter interconnects the voting module and the switching fabric.

16. The apparatus of claim 11 wherein a plurality of channel adapters interconnect, respectively, each of the plurality of data processing elements to the voting module and wherein the voting module compares packets being communicated from the channel adapters associated with at least two of the plurality of data processing elements.

17. The apparatus of claim 11 further comprising a plurality of voter delay buffers wherein each of the plurality of voter delay buffers is in communication with at least one of the plurality of data processing elements.

18. The apparatus of claim 11 wherein the transaction comprises at least one information packet.

* * * * *